Dec. 8, 1936.                    E. N. NORDHEM                    2,063,116
                           VIBRATORY ELECTRICAL MOTOR
                              Filed Oct. 21, 1933
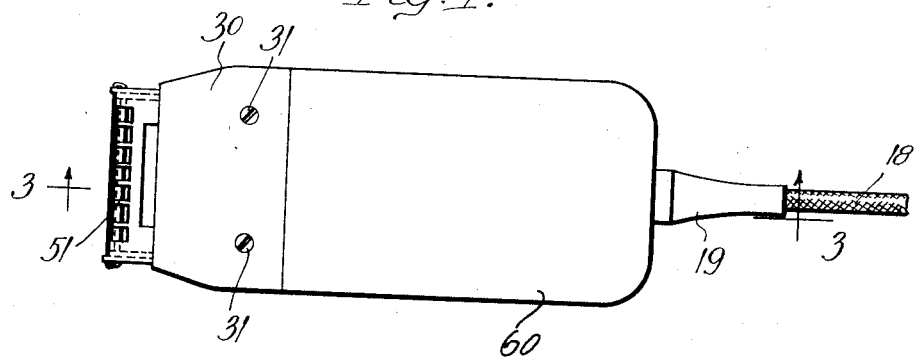
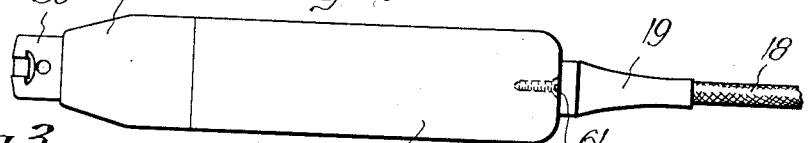
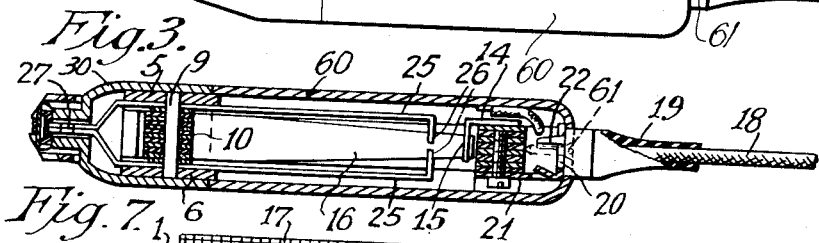
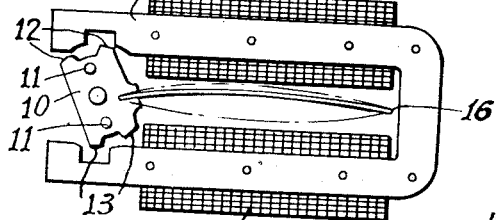
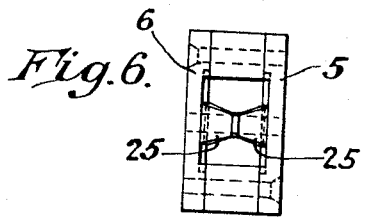
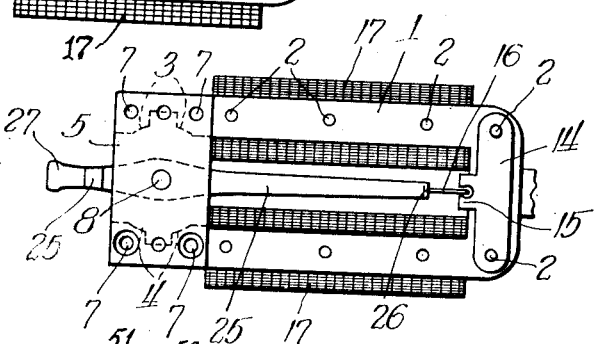
Inventor:
Eric N. Nordhem.
By
Atty.

Patented Dec. 8, 1936

2,063,116

UNITED STATES PATENT OFFICE 2,063,116

VIBRATORY ELECTRICAL MOTOR

Eric N. Nordhem, Chicago, Ill.

Application October 21, 1933, Serial No. 694,635

6 Claims. (Cl. 172—126)

The invention relates to electric motors, particularly to small motors adapted to produce an oscillatory or vibratory motion rather than a rotary motion, and has for its principal object the production of a motor of this type which is of simple and rugged construction, will operate reliably, and can be manufactured at a low cost.

Motors of this type may find application in many fields. For example, they may be used in shaving machines, hair clippers, vibrators, dentists' tools and for other purposes where vibratory mechanisms are employed. Heretofore, insofar as I am aware, these motors have converted a pulsating magnetic field into a rotating movement of an armature and have employed mechanical means, such as cams, to reconvert this rotary motion into an oscillatory or vibratory motion. Such an arrangement, while it may make for reliable operation, is costly to construct and requires considerable maintenance to keep it in proper working condition. Furthermore, motors of this type, and the devices in which they are incorporated, are apt to be unduly heavy for the amount of power that can be developed in them.

The present invention improves upon the prior art by eliminating the rotary motion, that is, by providing a mechanism which converts the pulsating magnetic field directly into an oscillatory mechanical motion. The motor made in accordance with my invention is of very simple design and can be constructed ruggedly at a low cost; it requires a minimum of maintenance to keep it in proper working condition. The amount of power that can be developed in a motor of a given weight is larger for the motor of my invention than for the motors of the prior art. The motor can be made to operate upon either alternating or direct current of commercial voltage, e. g., 110 volts, and the amount of power consumed is small.

In the accompanying drawing I have illustrated the invention by showing a motor incorporated in an electric razor or shaving apparatus, this embodiment being shown by way of example only.

In the drawing:

Figure 1 is a plan view of a completely assembled razor;

Figure 2 is an elevational view of the razor;

Figure 3 is a cross sectional view along the line 3—3 of Figure 1, looking in the direction of the arrows;

Figure 4 is an end view of the razor shown in Figure 1;

Figure 5 is a plan view of the motor with the armature removed;

Figure 6 is an end view of the assembly shown in Figure 5; and

Figure 7 is a plan view of the motor diagrammatically illustrating its operation;

Referring now to the drawing in more detail, particularly to Figures 3, 5 and 7, it will be seen that a U-shaped core member 1 serves as a stator for the motor and also as a frame upon which the parts of the mechanism are assembled and supported. The core 1 is preferably composed of a plurality of laminations which are held together by suitable means such as rivets 2. Poles 3 are formed on the inside face of one leg of the core, at a free end thereof, and similar poles 4 are formed in the other leg. A pair of nonmagnetic plates 5 and 6 may be provided to bridge the open end of the core and overlie the poles 3 and 4. Rivets or screws 7 may serve to hold the plates in place on the core. Two poles are formed on the inside face of each leg of the core, but it will be understood that the number of poles is a matter of choice. The torque or driving force will be substantially proportioned to the number of poles provided.

Plates 5 and 6 contain central perforations 8 which are aligned on the median line of the core and into which may be fitted a pivot pin 9. As shown in this embodiment, an armature 10 which rotates on the pin 9 is disposed between the plates. The armature may be formed of a plurality of laminations of magnetic material of low retentivity, held together by rivets 11. Poles 12 are formed on one side of the armature and poles 13 on the other side, these poles being adapted to register with poles 3 and 4, respectively, of the stator.

An L shaped plate 14 (which is also indicated in Figure 5 for the sake of convenience) may be secured to the closed end of the core by means of the rivets 2 and provided with a slotted ear 15 disposed on the median line of the core. A spring 16 (part of which is also shown in Figure 5) is fixed in a suitable slot in the armature 10 and registered with the slot in the ear 15. This spring is tensioned to rotate the armature so as to bring poles 12 and 13 out of registration with core poles 3 and 4 of the stator, so that when the core is demagnetized, the armature will assume the position substantially as shown in Figure 7. Coils 17 are held on the legs of the core by the plates 5 and 6 at the open end of the core, and, when connected to a suitable source of current, serve to magnetize the core so that the armature poles are drawn into registration with the core poles. Spring 16 is bent into the limits position shown by the lower dotted line, Figure 7, when the core is magnetized, and when the core is demagnetized the spring is carried, by the inertia of the armature, into the position shown by the upper dotted line.

The electrical circuit to the coils 17 may extend through a cord 18 containing suitably insulated wires. An insulating sleeve 19, preferably composed of soft rubber or other flexible and suitable material, is fitted over the cord and projected through an opening 20 in a plate 21. The plate is attached to the core 1 and the sleeve is secured in the plate by ears 22, thereby holding the cord to the core.

As will be seen from Figures 3 and 5, a forked lever 25 is journalled upon pin 9 and separated from the armature by suitable spacing washers. The free ends of the lever are turned inwardly and slotted at 26 to receive the spring 16 and to connect the lever thereto. The closed end 27 of the lever projects beyond the core and beyond the plates 5 and 6. It will be apparent that as the spring 16 is moved from one limits position to the other (as indicated in Figure 7), the lever 25 will be oscillated around the axis of pin 9. Since the lever is attached to the spring at a point removed from the line of maximum movement of the spring, the movement of the lever will be less than the maximum movement of the spring. By shortening or lengthening the lever, the point of attachment to the spring can be varied and the amount of movement of the lever thereby determined.

The razor mechanism or head of the device comprises a bracket or frame 30 which may be secured to plates 5 and 6 by screws 31. The frame projects beyond the end 27 of the lever 25, and is provided with a suitable opening into which the end 27 of the lever projects. Bracket 30 may conveniently be a casting composed of an aluminum alloy, or of a phenol condensation product, or any other desirable material. The free end of the bracket as shown is flat and contains the knives and guides therefor. One of the knives is movable and arranged to be operated by the end 27 of the actuating lever. A suitable safety guard 50 having teeth 51 may be provided. It is understood, of course, that I have shown my motor in conjunction with a razor mechanism only for the purpose of indicating one complete example of use. The motor may be used for operating or driving other apparatus, as previously indicated.

The motor is protected by a case-like handle 60 which fits over the assembly and is secured thereon in any preferred manner such as by means of screws 61 threaded through the end of the case and into the plate 21 or the core 1, as indicated in Figure 3.

The operation of the device is simple. When magnetism is built up in the core, armature 10 is moved clockwise (Figure 7) to bring poles 12 and 13 into registration with poles 3 and 4. Spring 16 operates to move lever 25 and thereby move the previously noted movable knife. The teeth on this knife move past the teeth on the stationary knife, and cutting results. As the magnetism in the core decreases, due to the opening of the coil circuit, in a direct current model, or due to the decay of the current wave in an alternating current model, the tension of spring 16 overcomes the magnetic attraction between the poles, and the armature is moved into the other extreme position, to complete the cycle of its operation. This latter movement moves the knife in the opposite direction and another cutting operation results. This cycle of operation continues as long as the coils are connected in the electrical circuit.

The advantages gained by the present invention include, among others, the assurance of speedy and reliable operation without resorting to complicated means of adjustment and maintenance. The dangers and inconveniences of over-travel are eliminated, e. g., over-travel will not cause hammering, since the air-gap is maintained substantially constant. Due to the construction and field as I have shown, the operation will be silent and efficient.

While I have chosen to illustrate my invention by showing and describing one embodiment of it, I have done so by way of example only and am not to be limited by the specific details shown. Modifications by one skilled in the art are possible within the teaching of the invention. Of the many possibilities that will suggest themselves to those skilled in the art, I wish to mention the provision of interrupted contacts whereby the device may be put in condition to be operated by direct current and also by alternating current. Means, e. g., sliding joints in the operating lever may be provided in order to adjust the stroke of the tool to be actuated.

Other modifications may be carried out within the scope of the following claims wherein I have defined and particularly pointed out what I consider new and desire to have protected by Letters Patent.

What is claimed is:

1. An electric motor comprising, a generally U shaped laminated core, pole pieces formed at the open ends of said core, a winding on said core arranged for connection with a source of electric current, an armature pivotally mounted in the open end of said core and composed of a plurality of laminations of magnetic material of low retentivity, pole pieces on said armature adapted to be registered with said core pole pieces, a spring disposed between said armature and core for holding said armature pole pieces normally out of registration with said pole pieces on said core, and a lever pivoted concentrically of said armature and embracing said spring.

2. In a motor, a stator core, a rotary armature, means disposed between said stator core and said armature and resiliently connecting the same for biasing said armature in a predetermined direction, an actuating member connected to said means, and operating means actuated by said member.

3. A vibratory mechanism including a motor comprising a stator core, a rotary armature, spring means disposed between said core and said armature and resiliently connecting the same for biasing said armature, said armature executing an oscillating movement, an operating mechanism, and lever means connecting said mechanism with said spring means for directly transmitting said oscillating motion of said armature to said mechanism.

4. In a device of the class described, a motor, a single stator core therefor having oppositely disposed pole pieces, an armature disposed centrally of said pole pieces, means for resiliently connecting said armature with said core, a driving member connected with said means, and a driven member connected with said driving member.

5. In a device of the class described, an oscillating motor comprising, a core having oppositely disposed pole pieces, an armature disposed centrally of said pole pieces and arranged for rotary oscillation therebetween, means for resiliently connecting said armature with said core, said means being effective to bias said armature to a predetermined radial position relative to said pole pieces and adapted to oscillate laterally responsive to said rotary oscillations of said armature, and a pivotally mounted driving member connected with said means.

6. In a device of the class described, an oscillating motor comprising, a core having oppositely disposed pole pieces, an armature disposed centrally of said pole pieces and arranged for rotary oscillation therebetween, means for resiliently connecting said armature with said core, said means being effective to bias said armature to a predetermined radial position relative to said pole pieces and adapted to oscillate laterally responsive to said rotary oscillation of said armature, a driving member connected with said means for transmitting said lateral oscillations thereof and a driven member connected with said driving member.

ERIC N. NORDHEM.